US010324673B1

(12) United States Patent
Dabon et al.

(10) Patent No.: US 10,324,673 B1
(45) Date of Patent: Jun. 18, 2019

(54) CUT-OUT PRINTING SYSTEM THAT PLACES CUT PATTERNS INTO WHITE SPACES ON A MEDIUM TO REDUCE WASTE

(71) Applicant: KYOCERA Document Solutions Inc., Osaka (JP)

(72) Inventors: Philip Ver Paloma Dabon, Torrance, CA (US); Neil-Paul Payoyo Bermundo, Glendora, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 44 days.

(21) Appl. No.: 15/863,694

(22) Filed: Jan. 5, 2018

(51) Int. Cl.
  *G06F 3/12* (2006.01)
  *B26F 1/38* (2006.01)
  *G06K 15/02* (2006.01)
  *B26D 5/00* (2006.01)
  *G06K 15/00* (2006.01)
  *B26F 1/24* (2006.01)

(52) U.S. Cl.
  CPC .......... *G06F 3/1252* (2013.01); *B26D 5/005* (2013.01); *B26F 1/24* (2013.01); *B26F 1/38* (2013.01); *G06F 3/1219* (2013.01); *G06F 3/1242* (2013.01); *G06K 15/1807* (2013.01); *G06K 15/1822* (2013.01); *G06K 15/1836* (2013.01); *G06K 15/1855* (2013.01); *G06K 15/404* (2013.01)

(58) Field of Classification Search
  CPC ...... G06F 3/1242; G06F 3/125; G06F 3/1251; G06F 3/1252; G06K 15/1885; B26F 1/38
  See application file for complete search history.

(56) References Cited

U.S. PATENT DOCUMENTS

| 5,748,762 A * | 5/1998 | Guez | B26D 5/00 |
| | | | 382/111 |
| 6,732,152 B2 | 5/2004 | Lockhart | |
| 9,652,185 B2 | 5/2017 | Ono | |

FOREIGN PATENT DOCUMENTS

DE          10144703          3/2002

OTHER PUBLICATIONS

Brother International Corporation; "ScanNCut Fabric Cutter with Built in Scanner CM100DM"; http://www.brother-usa.com/scanncut/cm100dm.aspx; Oct. 12, 2017; downloaded Jan. 9, 2018; 2 pages.

* cited by examiner

Primary Examiner — Eric A. Rust
(74) Attorney, Agent, or Firm — Fitch, Even, Tabin & Flannery LLP

(57) ABSTRACT

Methods and systems for arranging shapes within a document prior to printing cut-out patterns are described. A printing device may identify and group contents in a page of a print job as shapes to be cut out from the paper after they are printed. The printing device may then detect the grouped page contents as cut-out patterns. For each cut-out pattern, the printing device may detect the white spaces of content of the cut-out pattern and mark them as available for printing other cut-out patterns. Thus, the printing device may print multiple cut-out patterns on a same page based on using the white space within larger cut-out patterns.

18 Claims, 10 Drawing Sheets

CUT-OUT PRINTING SYSTEM THAT PLACES CUT PATTERNS INTO WHITE SPACES ON A MEDIUM TO REDUCE WASTE

BACKGROUND OF THE INVENTION

1. Field of the Invention

The present invention relates generally to printing and cutting, and more specifically to arranging shapes (also referred to as cut-out patterns) within a document prior to printing cut-out images.

2. Discussion of the Related Art

Various systems and processes are known in the art for arranging shapes (cut-out patterns) within a document prior to printing cut-out images. Methods for positioning pages on a sheet of paper include the Imposition and N-Up methods.

Imposition may refer to the arranging of regular sheets of paper onto a bigger destination paper. For example, it can be the arrangement of postcards or business cards onto an A3 or Letter paper. The smaller paper sizes may be rotated or inverted to maximize use of space in the larger destination paper.

For N-Up, input paper sizes are scaled down to fit in some pre-configured or pre-determined layout on the target destination paper, which may be the same or different size as the input paper size. For example, two Letter size pages may be fit inside a single Letter size paper. In such a case, the 2 Letter size may be arranged in portrait inside a landscape-oriented Letter size paper.

For both Imposition and N-Up, the inputs are full-size pages and do not take into account the content of the pages. In some cases, it is possible that the pages may be totally blank or may just contain single small objects, and they would be arranged and laid out on the destination sheet of paper as if the pages were full of content.

Those unprinted or un-used areas on the printout (i.e., where no shapes are drawn nor ink applied) may be known as white areas. In some cases, unused white areas may be thrown away as waste material. If each cut-out pattern takes up a single page, the waste material could be significant. That is, printer systems may not maximize the use of available printing space. Failing to use this available portion of the printing medium could result in waste and inefficiency.

SUMMARY

A printing device may identify and group contents in a page of a print job as shapes (cut-out patterns) to be cut out from the paper after they are printed. The printing device may then detect the grouped page contents as cut-out patterns. For each cut-out pattern, the printing device may detect the white space (portions of pages or images that are left unmarked, also referred to as negative space) of content of the cut-out pattern and mark it as available for printing other cut-out patterns. Thus, the printing device may print multiple cut-out patterns on a single page based on using the white space within larger cut-out patterns.

In one embodiment, a Cut-Out Printing System may include a printing device, a raster image processor, and a printing service comprising a white space detector adapted to detect white space in an image by detecting areas with no color, and an image combiner for combining a plurality of images at least one of which has been processed by the white space detector, by locating at least another of the plurality of images in the white space of the at least one of the plurality of images.

A method of making a system for printing and cutting is described. The method may include providing a printing device, providing a raster image processor, and providing a printing service comprising a white space detector adapted to detect white space in an image by detecting areas with no color, and an image combiner for combining a plurality of images at least one of which has been processed by the white space detector, by locating at least another of the plurality of images in the white space of the at least one of the plurality of images.

A method of printing and cutting is described. The method may include using a printing device, using a raster image processor, and using a printing service comprising a white space detector adapted to detect white space in an image by detecting areas with no color, and an image combiner for combining a plurality of images at least one of which has been processed by the white space detector, by locating at least another of the plurality of images in the white space of the at least one of the plurality of images.

In some examples of the Cut-Out Printing System described above, the raster image processor further comprises a drawing command generator adapted to generate markings for cut-out patterns between the plurality of images.

Some examples of the Cut-Out Printing System described above may also include a cutting device where the cutting device may be configured to cut the one of the plurality of images from the other of the plurality of images by cutting recording media after printing the one of the plurality of images and the other of the plurality of images, where the cutting comprises at least one of completely cutting the recording media and perforating the recording media.

In some examples of the Cut-Out Printing System described above, the method may further comprise printing a marking between the one of the plurality of images and the other of the plurality of images.

In one embodiment, a method may include receiving a first cut pattern, receiving a second cut pattern, receiving a third cut pattern, ordering the first cut pattern, the second cut pattern, and the third cut pattern from largest to smallest, identifying white space in the first cut pattern, the second cut pattern and the third cut pattern, locating the largest of the first cut pattern, the second cut pattern, and the third cut pattern on a page, determining whether a second largest of the first cut pattern, the second cut pattern, and the third cut pattern will fit within white space in the largest of the first cut pattern, the second cut pattern, and the third cut pattern, locating when the second largest of the first cut pattern, the second cut pattern, and the third cut pattern will fit within white space in the largest of the first cut pattern, the second cut pattern, and the third cut pattern, the second largest of the first cut pattern, the second cut pattern, and the third cut pattern within white space in the largest of the first cut pattern, the second cut pattern, and the third cut pattern, and locating when the second largest of the first cut pattern, the second cut pattern, and the third cut pattern will not fit within white space in the largest of the first cut pattern, the second cut pattern, and the third cut pattern, a third largest of the first cut pattern, the second cut pattern, and the third cut pattern within white space in the largest of the first cut pattern, the second cut pattern, and the third cut pattern.

In one embodiment, a non-transitory computer-readable medium may include instructions operable to cause a processor to receive a first cut pattern, receive a second cut pattern, receive a third cut pattern, order the first cut pattern, the second cut pattern, and the third cut pattern from largest to smallest, identify white space in the first cut pattern, the second cut pattern and the third cut pattern, locate the largest of the first cut pattern, the second cut pattern, and the third cut pattern on a page, determine whether a second largest of the first cut pattern, the second cut pattern, and the third cut pattern will fit within white space in the largest of the first cut pattern, the second cut pattern, and the third cut pattern, locate when the second largest of the first cut pattern, the second cut pattern, and the third cut pattern will fit within white space in the largest of the first cut pattern, the second cut pattern, and the third cut pattern, the second largest of the first cut pattern, the second cut pattern, and the third cut pattern within white space in the largest of the first cut pattern, the second cut pattern, and the third cut pattern, and locate when the second largest of the first cut pattern, the second cut pattern, and the third cut pattern will not fit within white space in the largest of the first cut pattern, the second cut pattern, and the third cut pattern, a third largest of the first cut pattern, the second cut pattern, and the third cut pattern within white space in the largest of the first cut pattern, the second cut pattern, and the third cut pattern.

In one embodiment, a system may include one or more components configured to receive a first cut pattern, receive a second cut pattern, receive a third cut pattern, order the first cut pattern, the second cut pattern, and the third cut pattern from largest to smallest, identify white space in the first cut pattern, the second cut pattern and the third cut pattern, locate the largest of the first cut pattern, the second cut pattern, and the third cut pattern on a page, determine whether a second largest of the first cut pattern, the second cut pattern, and the third cut pattern will fit within white space in the largest of the first cut pattern, the second cut pattern, and the third cut pattern, locate when the second largest of the first cut pattern, the second cut pattern, and the third cut pattern will fit within white space in the largest of the first cut pattern, the second cut pattern, and the third cut pattern, the second largest of the first cut pattern, the second cut pattern, and the third cut pattern within white space in the largest of the first cut pattern, the second cut pattern, and the third cut pattern, and locate when the second largest of the first cut pattern, the second cut pattern, and the third cut pattern will not fit within white space in the largest of the first cut pattern, the second cut pattern, and the third cut pattern, a third largest of the first cut pattern, the second cut pattern, and the third cut pattern within white space in the largest of the first cut pattern, the second cut pattern, and the third cut pattern.

In one embodiment, an apparatus may include means for receiving a first cut pattern, means for receiving a second cut pattern, means for receiving a third cut pattern, means for ordering the first cut pattern, the second cut pattern, and the third cut pattern from largest to smallest, means for identifying white space in the first cut pattern, the second cut pattern and the third cut pattern, means for locating the largest of the first cut pattern, the second cut pattern, and the third cut pattern on a page, means for determining whether a second largest of the first cut pattern, the second cut pattern, and the third cut pattern will fit within white space in the largest of the first cut pattern, the second cut pattern, and the third cut pattern, means for locating when the second largest of the first cut pattern, the second cut pattern, and the third cut pattern will fit within white space in the largest of the first cut pattern, the second cut pattern, and the third cut pattern, the second largest of the first cut pattern, the second cut pattern, and the third cut pattern within white space in the largest of the first cut pattern, the second cut pattern, and the third cut pattern, and means for locating when the second largest of the first cut pattern, the second cut pattern, and the third cut pattern will not fit within white space in the largest of the first cut pattern, the second cut pattern, and the third cut pattern, a third largest of the first cut pattern, the second cut pattern, and the third cut pattern within white space in the largest of the first cut pattern, the second cut pattern, and the third cut pattern.

Some examples of the method, non-transitory computer-readable medium, system, and apparatus described above may further include processes, features, means, or instructions for printing the page with the ones of the first cut pattern, the second cut pattern, and the third cut pattern having been located.

Some examples of the method, non-transitory computer-readable medium, system, and apparatus described above may further include processes, features, means, or instructions for finishing the page by cutting at a perimeter of the ones of the first cut pattern, the second cut pattern, and the third cut pattern having been located.

In one embodiment, a method may include generating an output image by placing a plurality of input images into an output image, identifying white space in one of the plurality of input images, determining the largest one of remaining ones of the plurality of input images that will fit the white space having been identified, locating the largest one of the remaining ones of the plurality of input images having been determined in the white space, and generating the output image comprising one of the plurality of input images and the largest one of the remaining ones of the plurality of input images having been positioned in the white space.

In one embodiment, a non-transitory computer-readable medium may include instructions operable to cause a processor to generate an output image by placing a plurality of input images into an output image, identify white space in one of the plurality of input images, determine the largest one of remaining ones of the plurality of input images that will fit the white space having been identified, locate the largest one of the remaining ones of the plurality of input images having been determined in the white space, and generate the output image comprising one of the plurality of input images and the largest one of the remaining ones of the plurality of input images having been positioned in the white space.

In one embodiment, a system may include one or more components configured to identify white space in one of a plurality of input images, determine the largest one of remaining ones of the plurality of input images that will fit the white space having been identified, position the largest one of the remaining ones of the plurality of input images in the white space, and generate an output image comprising the one of the plurality of input images and the largest one of the remaining ones of the plurality of input images positioned in the white space.

In one embodiment, an apparatus may include means for generating an output image by placing a plurality of input images into an output image, means for identifying white space in one of the plurality of input images, means for determining the largest one of remaining ones of the plurality of input images that will fit the white space having been identified, means for locating the largest one of the remaining ones of the plurality of input images having been determined in the white space, and means for generating the output image comprising one of the plurality of input images and the largest one of the remaining ones of the plurality of input images having been positioned in the white space.

Some examples of the method, non-transitory computer-readable medium, system, and apparatus described above may further include processes, features, means, or instructions for printing the output image.

Some examples of the method, non-transitory computer-readable medium, system, and apparatus described above may further include processes, features, means, or instructions for identifying, after the locating of the largest one of the remaining ones of the plurality of input images, remaining white space in the one of the plurality of input images. Some examples of the method, non-transitory computer-readable medium, system, and apparatus described above may further include processes, features, means, or instructions for determining, after the identifying of the remaining white space, a next largest one of the remaining ones of the plurality of input images that will fit in the remaining white space. Some examples of the method, non-transitory computer-readable medium, system, and apparatus described above may further include processes, features, means, or instructions for positioning the next largest one of the remaining ones of the plurality of input images having been determined in the remaining white space.

In some examples of the method, non-transitory computer-readable medium, system, and apparatus described above, the identifying of the white space in the one of the plurality of input images comprises excluding a margin from the white space, and where the identifying of the remaining white space in the one of the plurality of input images comprises excluding another margin from the remaining white space.

In some examples of the method, non-transitory computer-readable medium, system, and apparatus described above, the identifying of the white space in the one of the plurality of input images comprises excluding a margin from the white space.

Some examples of the method, non-transitory computer-readable medium, system, and apparatus described above may further include processes, features, means, or instructions for identifying a cut line, where the cut line may be a prescribed distance from an edge of the one of the plurality of input images.

Some examples of the method, non-transitory computer-readable medium, system, and apparatus described above may further include processes, features, means, or instructions for identifying another cut line, where the other cut line may be another prescribed distance from an edge of the largest one of the remaining ones of the plurality of input images having been determined.

Some examples of the method, non-transitory computer-readable medium, system, and apparatus described above may further include processes, features, means, or instructions for identifying a cut line, where the cut line may be a prescribed distance from an edge of the one of the plurality of input images, printing the output image, and printing a marking indicator along the cut line having been identified.

Some examples of the method, non-transitory computer-readable medium, system, and apparatus described above may further include processes, features, means, or instructions for identifying another cut line, where the other cut line may be another prescribed distance from an edge of the largest one of the remaining ones of the plurality of input images having been determined, and printing another marking indicator along the other cut line.

Some examples of the method, non-transitory computer-readable medium, system, and apparatus described above may further include processes, features, means, or instructions for identifying another cut line, where the other cut line may be another prescribed distance from an edge of the largest one of the remaining ones of the plurality of input images having been determined, and perforating the paper along the other cut line.

Some examples of the method, non-transitory computer-readable medium, system, and apparatus described above may further include processes, features, means, or instructions for identifying a cut line, where the cut line may be a prescribed distance from an edge of the one of the plurality of input images, printing the output image onto paper, and perforating the paper along the cut line having been identified.

Some examples of the method, non-transitory computer-readable medium, system, and apparatus described above may further include processes, features, means, or instructions for identifying a cut line, where the cut line may be a prescribed distance from an edge of the one of the plurality of input images, printing the output image onto paper, and cutting the paper along the cut line having been identified.

Some examples of the method, non-transitory computer-readable medium, system, and apparatus described above may further include processes, features, means, or instructions for identifying another cut line, where the other cut line may be another prescribed distance from an edge of the largest one of the remaining ones of the plurality of input images having been determined, and cutting the paper along the other cut line.

DETAILED DESCRIPTION

Figure 1:
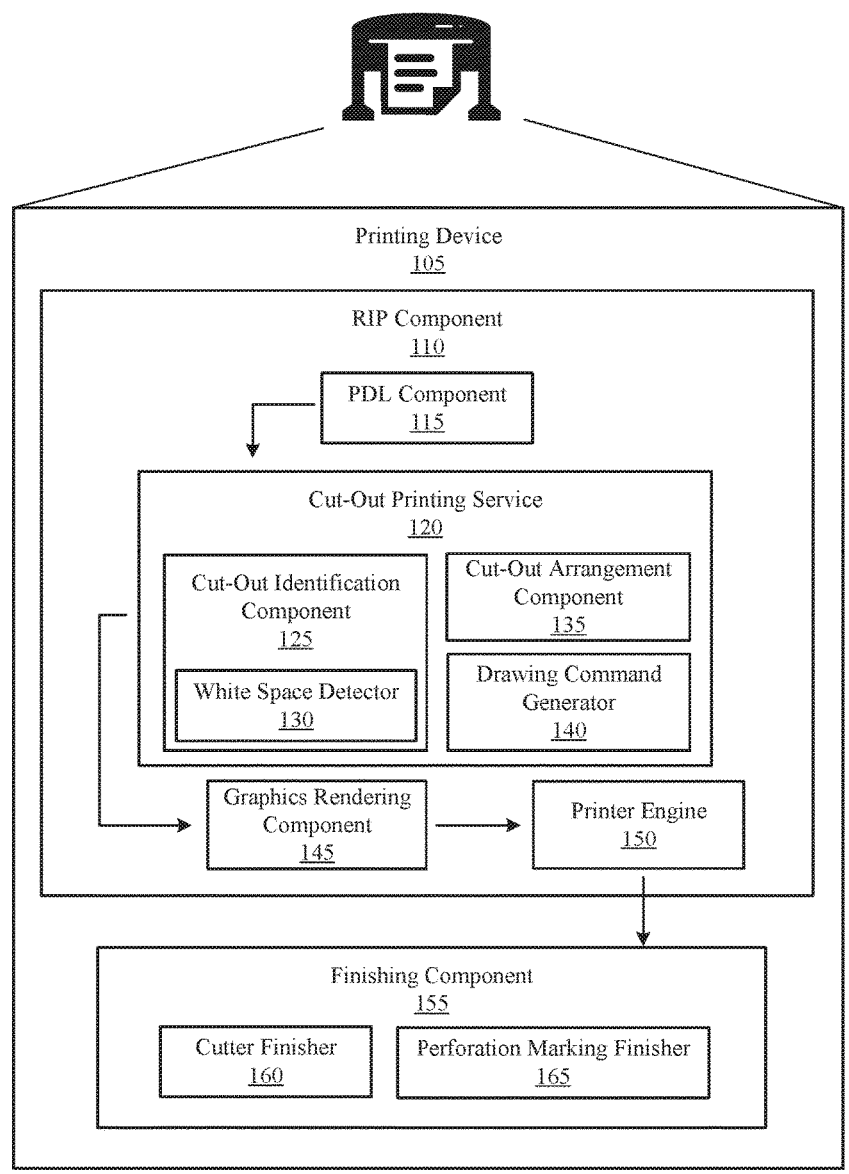
FIG. 1 shows a diagram of a Cut-Out Printing System that supports arranging shapes (also referred to as images and/or cut-out patterns) within a document prior to printing cut-out images in accordance with aspects of the present disclosure.

The following description is not to be taken in a limiting sense but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

According to the present disclosure, a print job may include shapes, cut-out patterns or other markings on the page that are intended to be cut-out patterns. The printing device may identify and/or group contents in a page as shapes to be cut out from the printing medium after they are printed. In some cases, a printing device may include raster image processor (RIP) firmware. The RIP firmware itself may enable the drawing of labels, images, cut-out patterns and shapes as defined in documents or page description language (PDL) print jobs.

The printing device may detect the grouped page contents as candidates for cutting out of the paper (e.g., using a PDL Interpreter). Such groups of shapes or cut-out patterns can be called cut-out patterns. For each cut-out pattern, the printing device may detect the white space of content of the cut-out pattern, and mark it as available for use for other cut-out patterns. In effect, there may eventually be nested cut-out patterns on the printed paper.

In some embodiments, "white area" and "white space" refer to an area in the printed paper without rendered shape or page object. White area/space may correspond to the parts of a cut-out pattern that has no color nor drawing. For example, in a donut raster image, the hole in the middle of the donut may be considered a white area, because the area will be unused and unprinted on in the actual printed paper.

In some embodiments, "cut-out path" and "clipping path" refer to a shape path to be used by the cutting finisher or perforation marking tool to cut out the cut-out pattern from the paper. A shape path may be a regular shape (e.g. circle, square, and rectangle) or an irregular shape comprising a series of coordinate points. In some embodiments, a cut-out path may comprise a mathematical formula that draws a shape with coordinates and/or locations on paper.

FIG. 1 shows a diagram 100 of a Cut-Out Printing System that supports arranging shapes within a document prior to printing cut-out images in accordance with aspects of the present disclosure. Cut-Out Printing System may include Printing Device 105.

Printing Device 105 may include raster image processor (RIP) component 110 and Finishing Component 155. In some cases, the Printing Device 105 is configured to print a marking between the one of a plurality of images and another of the plurality of images.

RIP component 110 may be an example of a raster image processor. In some examples, RIP component 110 may include page description language (PDL) Component 115, Cut-Out Printing Service 120, Graphics Rendering Component 145, and Printer Engine 150.

The PDL Component 115 may parse an incoming print job until it consumes all of the data, and translate the data into a format readable by the Cut-Out Printing Service 120 and the Graphics Rendering Component 145. The PDL component 115 may include one or more PDL interpreters for different computing languages. Such languages may include printer command language (PCL) 5, PCL 6 (XL), XPS, PDF, PostScript, and so on. The PDL Interpreter may parse and translate the commands, data, and features of the corresponding PDL.

Cut-Out Printing Service 120 may be an example of a printing service comprising a white space detector 130 adapted to detect white space in an image by detecting areas with no color, and an image combiner for combining a plurality of images at least one of which has been processed by the white space detector 130, by locating at least another of the plurality of images in the white space of the at least one of the plurality of images.

Cut-Out Printing Service 120 may receive a first cut-out pattern; receive a second cut pattern; receive a third cut pattern; and generate an output image by placing a plurality of input images (e.g., the first cut-out pattern, the second cut-out pattern, and the third cut-out pattern) into an output image. In some examples, Cut-Out Printing Service 120 may include Cut-Out Identification Component 125, Cut-Out Arrangement Component 135, and Drawing Command Generator 140.

The Cut-Out Printing Service 120 receives the parsed print job data, such as PDL commands, page content data (text (which is a special type of image), images, shapes, cut-out patterns and so on) and other features from the PDL component 115. The parsed data may come in the form of shapes or page objects like text, rasters/images, etc. The Cut-Out Printing Service 120 may then identify shapes and page objects, group, and sort shapes, relocate cut-out patterns to white areas, and mark cut-out patterns for the finishers.

The Cut-Out Printing Service 120 may identify shapes, determine the page locations of each shape, and determine the white areas within each shape. Areas may be determined to be white areas if there is no color (toner, ink) or if transparency inside the shape meets a threshold level (e.g., 100% transparency). In some cases, an incoming pattern has 100% transparency, but it overlaps a previously positioned cut-out pattern. If the overlapping areas are not empty or transparent, then they may not be counted as white areas. These areas may be re-marked as a non-white area or occupied.

The Cut-Out Printing Service 120 may then group overlapping shapes. These grouped shapes may be considered a cut-out pattern. As the Cut-Out Printing Service 120 groups the overlapping shapes, it may re-determine the white areas. The new white areas may be assigned to the identified or formed cut-out pattern.

The Cut-Out Printing Service 120 may then sort the cut-out patterns based on the total area and the size of the white area. The Cut-Out Printing Service 120 may then re-process and sort the cut-out patterns to make use of the white areas. Smaller cut-out patterns that fit into the white areas may be repositioned for rendering into the white areas. This may effectively compress the page contents into less space on the page. In some cases, it may be possible to group all shapes from multiple pages into one page, thereby maximizing use of the printing medium.

The Cut-Out Printing Service 120 may then tag values to be assigned to each cut-out path (or clipping path) for use in the finishers. (A cut-out path or clipping path is a closed vector path, or shape, used to cut out a 2D image. Any portion of the shape inside the path will be included after the cut-out path, (or clipping path) is applied, and anything outside the path will be omitted.) In some cases, drawing commands may be added to describe the cut-out path or outline. This would be additional drawing data for processing in Graphics Rendering Component 145. This may result in the rendering of dashed lines, the markings for perforation marks around the cut-out patterns and in the interior white areas, and the markings for cutting around the cut-out patterns and interior white areas.

Cut-Out Identification Component 125 may order multiple patterns (e.g., the aforementioned first cut pattern, second cut pattern, and third cut pattern) from largest to smallest; identify white space in the first cut pattern, the second cut pattern and the third cut pattern; locate the largest of the first cut pattern, the second cut pattern, and the third cut pattern on a page; identify white space in one of the plurality of input images; determine the largest one of remaining ones of the plurality of input images that will fit the white space having been identified; and locate the largest one of the remaining ones of the plurality of input images having been determined in the white space. In some examples, Cut-Out Identification Component 125 may include White Space Detector 130.

In some cases, the identifying of the white space in the one of the plurality of input images comprises excluding a margin from the white space, and where the identifying of the remaining white space in the one of the plurality of input images comprises excluding another margin from the remaining white space. In some cases, the identifying of the white space in the one of the plurality of input images comprises excluding a margin from the white space.

Cut-Out Arrangement Component 135 may determine whether a second largest of the first cut pattern, the second cut pattern, and the third cut pattern will fit within white space in the largest of the first cut pattern, the second cut pattern, and the third cut pattern; and locate when the second largest of the first cut pattern, the second cut pattern, and the third cut pattern will fit within white space in the largest of the first cut pattern, the second cut pattern, and the third cut pattern, the second largest of the first cut pattern, the second cut pattern, and the third cut pattern within white space in the largest of the first cut pattern, the second cut pattern, and the third cut pattern; locate when the second largest of the first cut pattern, the second cut pattern, and the third cut pattern will not fit within white space in the largest of the first cut pattern, the second cut pattern, and the third cut pattern, a third largest of the first cut pattern, the second cut pattern, and the third cut pattern within white space in the largest of the first cut pattern, the second cut pattern, and the third cut pattern.

Cut-Out Arrangement Component 135 may also generate the output image comprising one of the plurality of input images and the largest one of the remaining ones of the plurality of input images having been positioned in the white space; identify, after the locating of the largest one of the remaining ones of the plurality of input images, remaining white space in the one of the plurality of input images; determine, after the identifying of the remaining white space, a next largest one of the remaining ones of the plurality of input images that will fit in the remaining white space; and position the next largest one of the remaining ones of the plurality of input images having been determined in the remaining white space.

Drawing Command Generator 140 may identify cut-out patterns and add additional drawing and cutting commands. For example, Drawing Command Generator 140 may identify a cut line, where the cut line is a prescribed distance from an edge of the one of the plurality of input images; identify another cut line, where the other cut line is another prescribed distance from an edge of the largest one of the remaining ones of the plurality of input images having been determined; identify a cut line, where the cut line is a prescribed distance from an edge of the one of the plurality of input images, printing the output image, and printing a marking indicator along the cut line having been identified; identify another cut line, where the other cut line is another prescribed distance from an edge of the largest one of the remaining ones of the plurality of input images having been determined, and printing another marking indicator along the other cut line; identify another cut line, where the other cut line is another prescribed distance from an edge of the largest one of the remaining ones of the plurality of input images having been determined, and perforating the paper along the other cut line; identify a cut line, where the cut line is a prescribed distance from an edge of the one of the plurality of input images, printing the output image onto paper, and perforating the paper along the cut line having been identified; identify a cut line, where the cut line is a prescribed distance from an edge of the one of the plurality of input images, printing the output image onto paper, and cutting the paper along the cut line having been identified; and identify another cut line, where the other cut line is another prescribed distance from an edge of the largest one of the remaining ones of the plurality of input images having been determined, and cutting the paper along the other cut line.

In some cases, the raster image processor component 110 further comprises a Drawing Command Generator 140 adapted to generate markings for cut-out patterns between the plurality of images.

The Graphics Rendering Component 145 may receive data from the Cut-Out Printing Service 120 and translate the data to a lower-level format for the Printer Engine 150. The lower-level format may be known as the orderlist and may include a list of configuration, drawing and marking commands. In some examples, the cut-out patterns described and drawn from the graphics orders would still compose a single page (or other media that can be cut) from the perspective of the Graphics Rendering Component 145. However, the pages processed in the Graphics Rendering Component 145 may not be the same pages generated by the PDL component 115.

In some embodiments, "orderlist" refers to binary data representation to which PDL commands are translated to by a graphics rendering component. Orderlists may comprise low-level graphics instructions (also known as graphics orders) that a Multi-Function Printer (MFP) hardware understands and processes to translate to actual markings on the page.

In some cases, print job data may be processed on a page-by-page basis. That is, the graphics orders each belong to and are drawn on each page in order. However, in some cases, the graphics orders may be impacted by the Cut-Out Printing System. That is, the Cut-Out Printing System may re-order the page contents in order to utilize white areas. The Cut-Out Printing System may also add extra drawing commands to describe the cut-out path or outline. These drawing commands could result in the Graphics Rendering Component 145 generating graphics orders for dashed lines and/or perforation marks around the cut-out patterns and in the interior white areas.

Printer Engine 150 may print the page with the ones of the first cut pattern, the second cut pattern, and the third cut pattern having been located and print the output image. The Printer Engine 150 may process the graphics orderlist from the Graphics Rendering Component 145, and perform actual drawing and application of ink or toner onto physical paper media (or other printable media). This may include rendered dashed-lines and perforations if those features were enabled for the print job. In some cases, the Printer Engine 150 may include GEU, Halftone, and Video subcomponents.

In some examples, Finishing Component 155 may include Cutter Finisher 160 and Perforation Marking Finisher 165.

Cutter Finisher 160 may be an example of a cutting device configured to cut the one of the plurality of images from the other of the plurality of images by cutting recording media after printing the one of the plurality of images and the other of the plurality of images, where the cutting comprises completely cutting the recording media. Thus, finishing the page may include cutting at a perimeter of the ones of the first cut pattern, the second cut pattern, and the third cut pattern having been located.

The Cutter Finisher 160 performs the actual cutting of the cut-out patterns generated through the Cut-Out Printing System. Each cut-out pattern may enclose smaller cut-out pattern that happened to fit inside its white areas.

In addition or alternatively, the Perforation Marking Finisher 165 cuts, pokes or punches tiny pointed marks or holes that form perforation marks on the page that separate one of the plurality of images and the others of the plurality of images, where the cutting comprises perforating (or partially cutting) the recording media. Thus, finishing the page may include perforating at a perimeter of the ones of the first cut pattern, the second cut pattern and the third cut pattern having been located. Perforation Marking Finisher 165 designs may include rollers with single perforation pins and rollers with multiple rows of perforation pins.

Once paper is printed on, it may be fed onto the Cutter Finisher 160 for cutting or Perforation Marking Finisher 165 for cutting of perforations.

Figure 2:
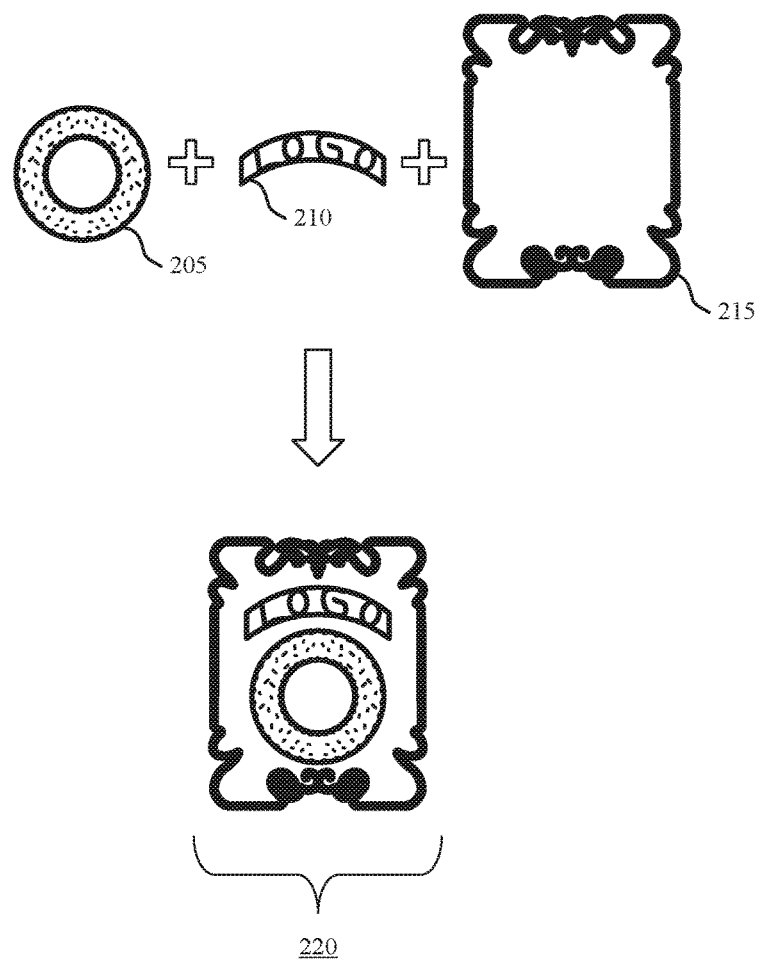
FIGS. 2 and 3 show diagrams of Cut-Out Print Arrangements based on arranging shapes within a document prior to printing cut-out images in accordance with aspects of the present disclosure.

FIG. 2 shows a diagram 200 of a first example of a Cut-Out Print Arrangement based on arranging shapes within a document prior to printing the shapes in accordance with aspects of the present disclosure. In this example, there may be three pages to be printed with different patterns or objects: a Donut 205, a Logo 210 and a Frame 215. These objects may be combined to form Cut-Out Print Arrangement 220. The Donut 205, Logo 210 and Frame 215 may each be a cut-out pattern. The Logo 210 may be cut as grouped text and not as individual letters.

A document editing application or printer driver setting may provide the option to cut along the outline of the full string of the Logo 210, or enclose it in a rectangular or curved shape.

Thus, the patterns from each of the three pages may be combined into one sheet if they can be arranged so that smaller shapes are fit and positioned in the white spaces of the bigger cut-out patterns to form Cut-Out Print Arrangement 220.

Figure 3:
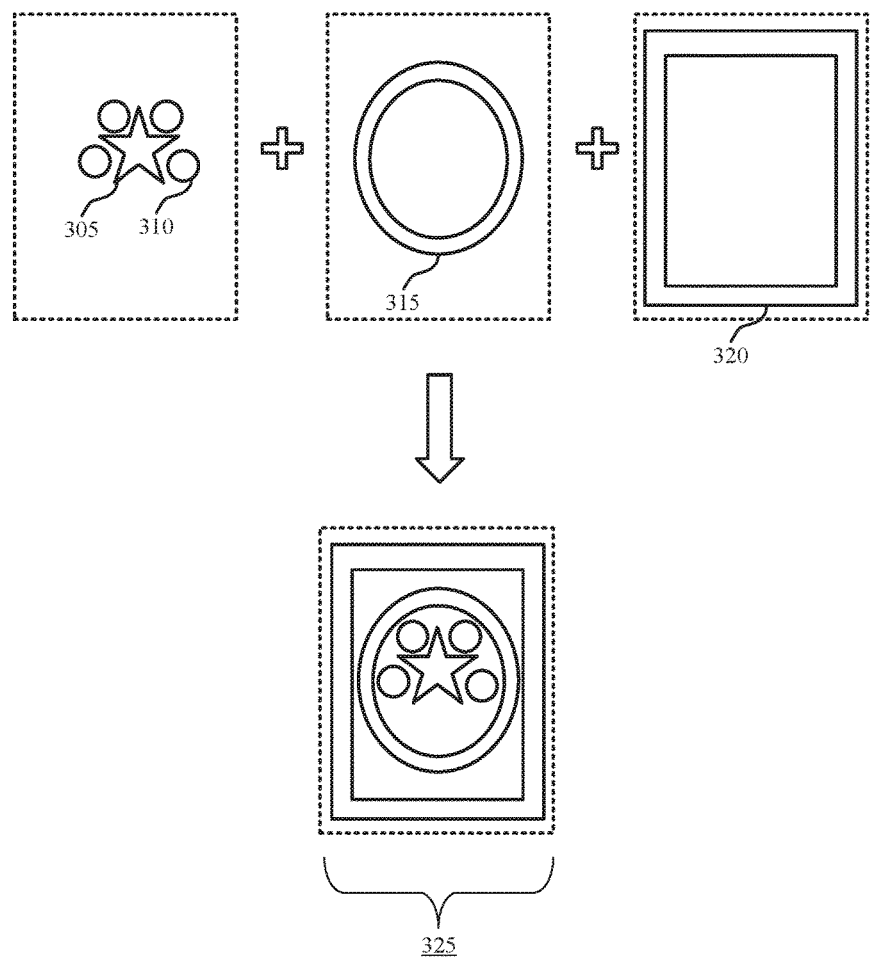

FIG. 3 shows a diagram 300 of a second example of a Cut-Out Print Arrangement based on arranging shapes within a document prior to printing cut-out images in accordance with aspects of the present disclosure. Diagram 300 may include Star 305, Small Circles 310, Large Circle 315, and Rectangle 320. These objects may be combined to form Cut-Out Print Arrangement 325. In this example, Cut-Out Print Arrangement 325 has 4 shapes, each of which is a cut-out pattern on its own. There is much-wasted paper material when these are printed on separate sheets of paper.

The following steps may be used to order the shapes from largest to smallest, including consideration and factoring of the dimension of interior white spaces. The order of patterns may be Rectangle 320, Large Circle 315, Star 305, and 4 Small Circles 310. The method may find and select the Rectangle 320 as the largest one and as one with largest white space among all the cut-out patterns, and position this rectangular frame on the logical page. The Cut-Out Printing Service may then search for next largest cut-out pattern and may find the Large Circle 315 as the next pattern to process.

The Cut-Out Printing Service may then detect the interior white space in the Rectangle 320 as available and can accommodate the circle. The Cut-Out Printing Service may then position the Large Circle 315 inside the interior white space of the Rectangle 320. The Cut-Out Printing Service may next find the Star 305 as the next largest cut-out pattern.

The Cut-Out Printing Service may then find that the white space within the Large Circle 315 can accommodate the Star 305. The Cut-Out Printing Service may then position the Star 305 in the interior white space of the circle. The Cut-Out Printing Service may then repeat this process for the Small Circles 310, and the Cut-Out Printing Service may find that they can be accommodated in the remaining white space inside the circle, but outside the area occupied by the Star 305.

If the Small Circles 310 comprises four separate cut out patterns, it is possible that the individual circles may fit in the white spaces between the Large Circle 315 and the interior edges of the Rectangle 320. If the circles do fit in the white spaces between the Larger Circle 315 and the interior edges of the Rectangle 320, the circles may be positioned in the white spaces between the Large Circle 315 and the interior edges of the Rectangle 320. It is also possible that the Star 305 may get positioned more towards the top-center, top-left or anywhere inside the white spaces of the Large Circle 315. If so, the eventual position of the Small Circles 310 may end up somewhere else in the white spaces of the Large Circle 315. Thus, only one sheet may be used for Cut-Out Print Arrangement 325 in this example.

There may be more white spaces on the entire page that could be used for additional cut-out patterns, if there is ever any more of them left in the document or print job that user designed. This shows that there is potential for great savings of recording media or printing medium for the user, for the business, and for the environment.

Figure 4:
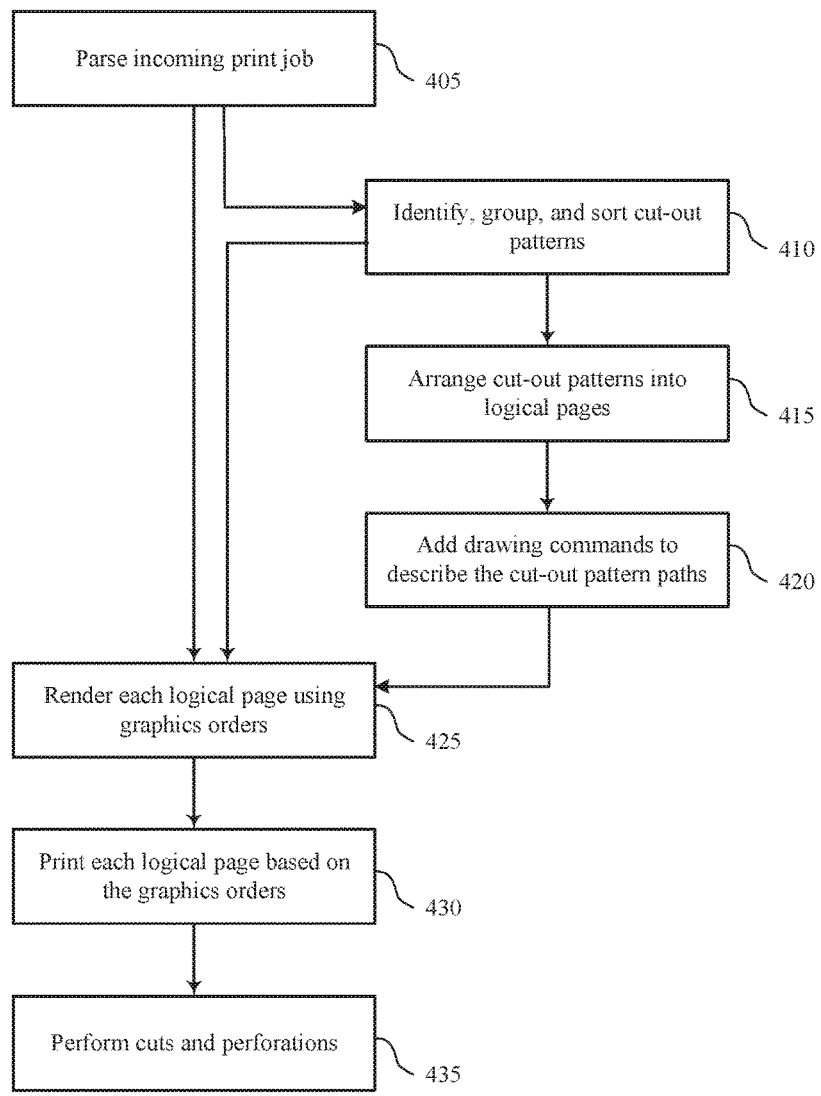
FIGS. 4 through 10 show flowcharts of a process for arranging shapes within a document prior to printing cut-out images in accordance with aspects of the present disclosure.

FIG. 4 shows a flowchart 400 of a process for arranging shapes within a document prior to printing cut-out images in accordance with aspects of the present disclosure. Specifically, flowchart 400 represents an overview of the printing process. In some examples, a Cut-Out Printing System may execute a set of codes to control functional elements of the Cut-Out Printing System to perform the described functions. Additionally, or alternatively, a Cut-Out Printing System may use special-purpose hardware.

At block 405 the Cut-Out Printing System may parse an incoming print job. These operations may be performed according to the methods and processes described in accordance with aspects of the present disclosure. For example, the operations may be composed of various substeps or may be performed in conjunction with other operations described herein. In certain examples, aspects of the described operations may be performed by PDL Component 115 as described with reference to FIG. 1.

At block 410, if cut-out printing is enabled, the Cut-Out Printing System may identify, group, and sort cut-out patterns. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Identification Component 125 as described with reference to FIG. 1. If cut-out printing is not enabled, or the print job does not have cut-outs, the process may proceed to block 425.

At block 415 the Cut-Out Printing System may arrange cut-out patterns into logical pages. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Arrangement Component 135 as described with reference to FIG. 1.

At block 420 the Cut-Out Printing System may add drawing commands to describe the cut-out pattern paths. These operations may be performed according to the methods and processes described in accordance with aspects of the present disclosure. For example, the operations may be composed of various substeps or may be performed in conjunction with other operations described herein. In certain examples, aspects of the described operations may be performed by Drawing Command Generator 140 as described with reference to FIG. 1.

At block 425 the Cut-Out Printing System may render each logical page using graphics orders. These operations may be performed according to the methods and processes described in accordance with aspects of the present disclosure. For example, the operations may be composed of various substeps or may be performed in conjunction with other operations described herein. In certain examples, aspects of the described operations may be performed by Graphics Rendering Component 145 as described with reference to FIG. 1.

At block 430 the Cut-Out Printing System may print each logical page based on the graphics orders. These operations may be performed according to the methods and processes described in accordance with aspects of the present disclosure. For example, the operations may be composed of various substeps or may be performed in conjunction with other operations described herein. In certain examples, aspects of the described operations may be performed by Printer Engine 150 as described with reference to FIG. 1.

At block 435 the Cut-Out Printing System may perform cuts and perforations. These operations may be performed according to the methods and processes described in accordance with aspects of the present disclosure. For example, the operations may be composed of various substeps or may be performed in conjunction with other operations described herein. In certain examples, aspects of the described operations may be performed by Finishing Component 155 as described with reference to FIG. 1.

Figure 5:
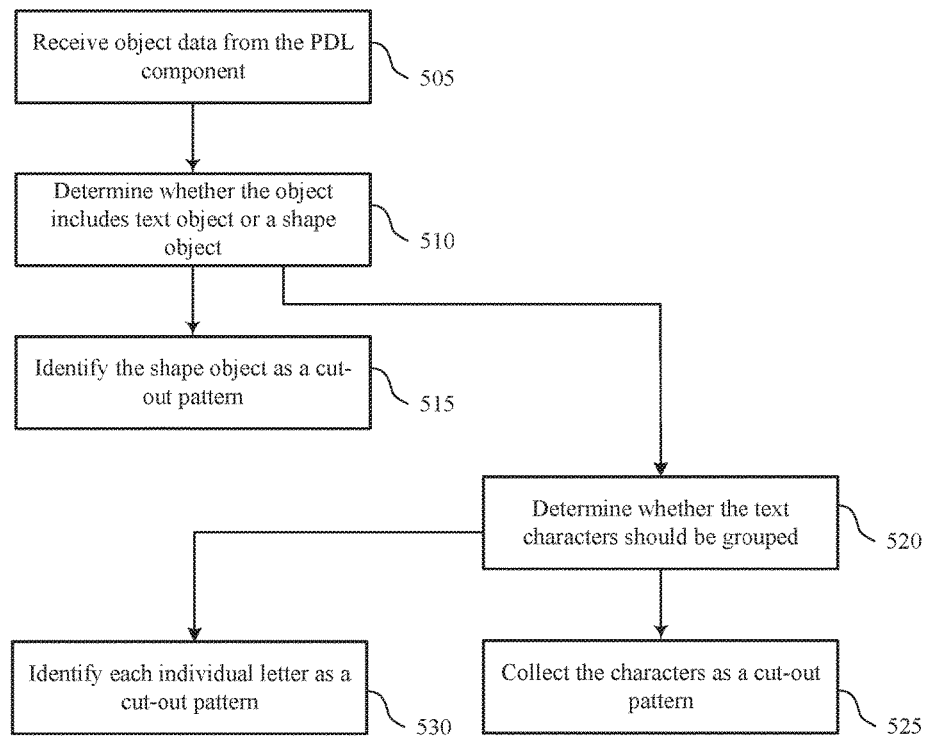

FIG. 5 shows a flowchart 500 of a process for arranging shapes within a document prior to printing cut-out images in accordance with aspects of the present disclosure. Specifically, flowchart 500 represents the identification and grouping of page contents into Cut-Out Patterns. In some examples, a Cut-Out Printing Service may execute a set of codes to control functional elements of the Cut-Out Printing Service to perform the described functions. Additionally, or alternatively, a Cut-Out Printing Service may use special-purpose hardware.

At block 505 the Cut-Out Printing Service may receive object data (e.g., text, images, shapes, cut-out patterns etc.) from the PDL component. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Printing Service 120 as described with reference to FIG. 1.

At block 510 the Cut-Out Printing Service may determine whether the object data comprises text object or an image/shape object. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Identification Component 125 as described with reference to FIG. 1. If the object comprises a shape or image the process may proceed to block 515, otherwise (i.e., if the object includes text) the process may proceed to block 520.

At block 515, if the object comprises a shape or image, the Cut-Out Printing Service may identify the shape object as a cut-out pattern. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Identification Component 125 as described with reference to FIG. 1.

At block 520, if the object includes text, the Cut-Out Printing Service may determine whether the text characters should be grouped. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Identification Component 125 as described with reference to FIG. 1. If the characters are intended to be grouped, the process may proceed to block 525. Otherwise, the process may proceed to block 530.

At block 525, if the text characters are intended to be grouped, the Cut-Out Printing Service may collect the characters as a cut-out pattern. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Identification Component 125 as described with reference to FIG. 1.

At block 530, if the characters are not intended to be grouped, the Cut-Out Printing Service may identify each individual letter or symbol (or text character) as a cut-out pattern. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Identification Component 125 as described with reference to FIG. 1.

Thus, any marked page contents on the page may be considered cut-out patterns to be cut from paper. Each letter, symbol, or text character, however small, could be a cut-out pattern by itself. However, in many cases, individual page contents may not be meant to be cut out separately. For example, each letter in a string may not be cut out as separate letters but instead may be cut out as a string of letters, symbols, or text characters (together referred to as single tokens). It would be groups of letters or strings that would have more practical use as a single cut-out pattern. Thus, the Cut-Out Printing System supports grouping of page content, and each group may be treated as a single cut-out pattern.

Another example is a string enclosed in a rectangular box. The outline of the box may not be intended to be cut separately, nor the letters within the box to be cut out individually. Instead, the rectangular box and the contained string may be cut as a single cut-out pattern. Thus, the Cut-Out Printing System may distinguish the white space inside the rectangular box, based on whether the white space is part of the cut-out pattern or not. That is, some areas can be assigned to be non-white spaces, and they may be detected and treated as actual data and part of the cut-out pattern. One method of specifying these non-white spaces may be to add a white color or 100% transparency on the space and surrounding the text.

In some cases, new features for printer drivers and/or document editing applications may be developed to mark individual letters or characters in a string, or to group letters as a single cut-out pattern, or to group patterns, images, and other types of page content as a group of images that are not to be cut out individually. That is, document editing applications may enable a user to outline shapes that may serve as the path for the cutter or perforation marking tools.

In yet another example, the printer driver may include a function capable of identifying groups of shapes. Users of the printer driver may select a printer preference that determines whether string tokens or full sentences or phrases may be cut out as a whole, on the outline of the string, or with margins (like a textbox). If images and other shapes are mixed with text, the cut-out pattern may be around the edges of the entire area occupied by the combined or overlapping text, shapes, and objects, or a rectangular or square area or other geometrical shape that surrounds the grouped objects.

Figure 6:
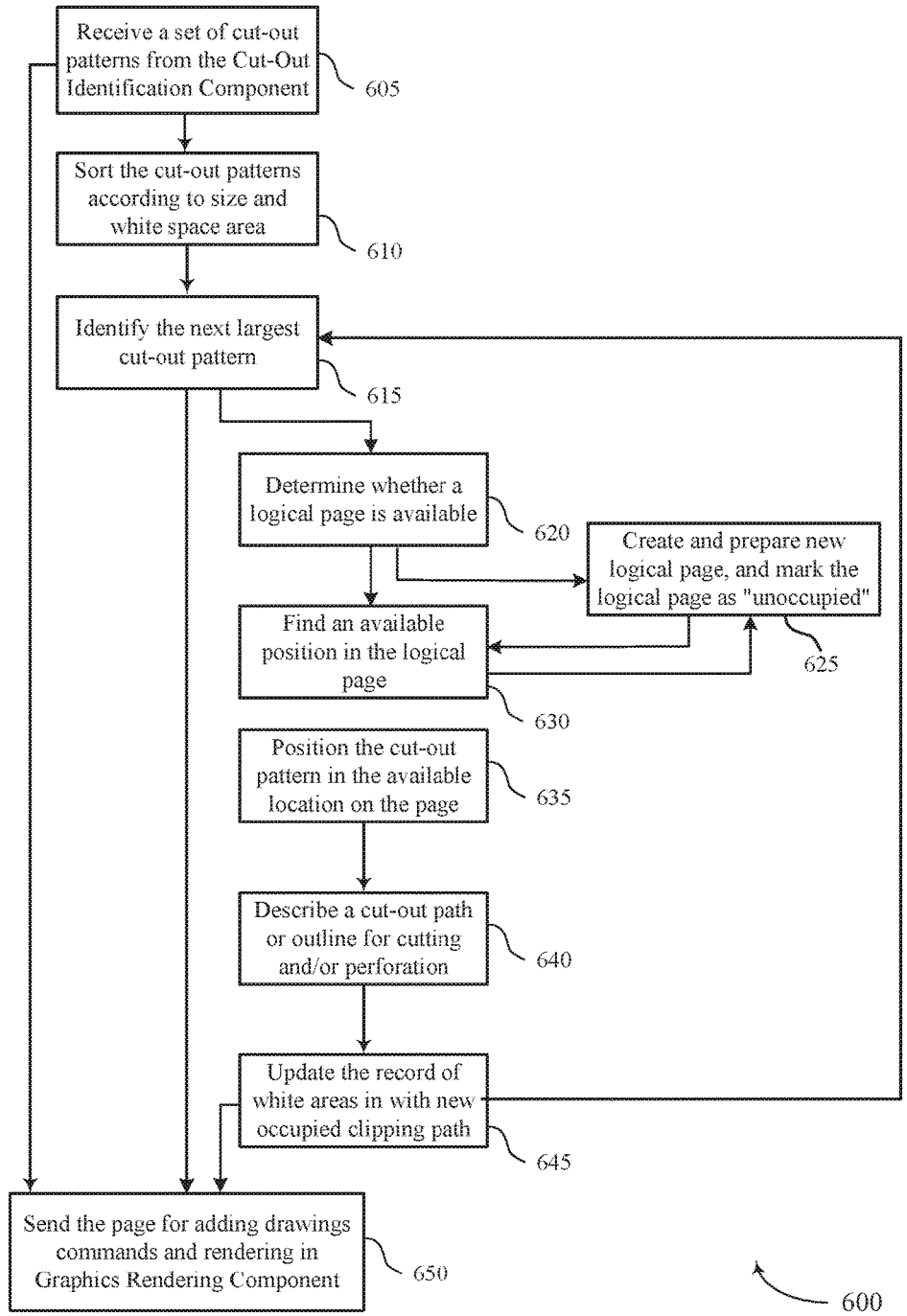

FIG. 6 shows a flowchart 600 of a process for arranging shapes within a document prior to printing cut-out patterns in accordance with aspects of the present disclosure. Specifically, flowchart 600 represents a method of arranging cut-out patterns into a compact printing area. In some examples, a Cut-Out Printing Service may execute a set of codes to control functional elements of the Cut-Out Printing Service to perform the described functions. Additionally, or alternatively, a Cut-Out Printing Service may use special-purpose hardware.

At block 605 the Cut-Out Printing Service may receive a set of cut-out patterns (e.g., from the Cut-Out Identification Component). These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Arrangement Component 135 as described with reference to FIG. 1. If there are cut-out patterns to arrange, the process may proceed to block 610, otherwise, the process may proceed to block 650.

At block 610 the Cut-Out Printing Service may sort the cut-out patterns according to size and white space. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Identification Component 125 or Cut-Out Arrangement Component 135 as described with reference to FIG. 1.

At block 615 the Cut-Out Printing Service may identify the next largest cut-out pattern. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Arrangement Component 135 as described with reference to FIG. 1. If there are no more cut-out patterns, the process may proceed to block 650. If the next largest cut-out pattern is identified, the process may proceed to block 620.

At block 620 the Cut-Out Printing Service may determine whether a logical page is available. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Arrangement Component 135 as described with reference to FIG. 1. If no logical page is available, the process may proceed to block 625. If a logical page is available, the process may proceed to block 630.

At block 625, if no logical page is available, the Cut-Out Printing Service may create and prepare a new logical page, and mark the logical page as "unoccupied." These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Arrangement Component 135 as described with reference to FIG. 1.

At block 630, if a logical page is available and unoccupied, the Cut-Out Printing Service may find an available position (white space) on the logical page. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Arrangement Component 135 as described with reference to FIG. 1. If no position is available, the process may return to block 625. If a position is available, the process may proceed to block 635.

At block 635, if a position is available, the Cut-Out Printing Service may position the cut-out pattern in the available location. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Arrangement Component 135 as described with reference to FIG. 1.

At block 640 the Cut-Out Printing Service may describe a cut-out path or outline for cutting and/or perforation. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Arrangement Component 135 as described with reference to FIG. 1.

At block 645 the Cut-Out Printing Service may create a record of white space in with the newly occupied cut-out pattern and/or cut-out path, or update the record of white space if the record already exists. The record of white space is a record of the extent of the white space. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Arrangement Component 135 as described with reference to FIG. 1.

At block 650 the Cut-Out Printing Service may send the page for adding drawings commands and rendering in Graphics Rendering Component. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Arrangement Component 135 as described with reference to FIG. 1.

During the processing of the data through the Cut-Out Printing Service, all cut-out patterns that are identified may be cached and gathered in internal memory, in an array, list, tree, hash table or other suitable data structure, or saved to disk or other location. Each cut-out pattern may be cached or saved with a reference counter, in case the exact same cut-out pattern is re-used on the same page or other pages. This may save memory for the processing of the entire print job.

Once all pages or series of pages are processed, the cut-out patterns that were cached or saved may be sorted. The purpose of the sorting is to find and fit the smaller cut-out patterns to fill the interior white spaces of larger cut-out patterns. In some cases, it is possible that there are no cut-out patterns with interior white spaces that can contain smaller cut-out patterns. In such cases, the Cut-Out Printing Service may fit as many cut-out patterns in the available spaces in the page as possible.

Once the Cut-Out Printing Service determines that all cut-out patterns are just big enough to fit in the page (i.e., that no other cut-out pattern may fit in the same page), it may proceed to filling the next page. In some cases, individual sheets may be used for printing each cut-out pattern. In other cases, where there are white spaces within cut-out patterns, the white spaces may be used and filled with smaller cut-out patterns and may result in optimal use of paper material.

After the cut-out patterns are identified, and prior to re-arranging the cut-out patterns to maximize use of white spaces, the cut-out patterns may be sorted first from largest to smallest dimension as first criterion, and largest to smallest interior white space as second criterion. It will be appreciated that other methods for ordering of the cut-out patterns may be used to optimize search for cut-out patterns that are to be re-positioned or re-located on the page.

In some cases, a printer driver may be set to mark cut-out patterns as they are generated. As the printer driver generates the patterns, it can fill a table-of-contents or index table that reflects the ordering of the patterns from largest to smallest, including sorting based on the sizes of the respective white areas in each pattern.

After the cut-out patterns are sorted, the Cut-Out Printing Service may find the next largest cut-out pattern (P). If none are found, the Cut-Out Printing Service may check if some cut-out patterns have been positioned in the current page, and eject the page from the printer, then exit the process, as all cut-out patterns were processed or there is no cut-out pattern found in this print job.

If there is no logical page (LP), a new logical page is created and prepared, and the entire page is marked as Unoccupied or available.

Next, the Cut-Out Printing Service may find a location (L) in LP where P can fit. Location L can be inside white space (interior white space) of another cut-out pattern (P_prior) that was previously positioned in LP, or an unoccupied space (white space) in LP. In some cases, the Cut-Out Printing Service may search through all interior white spaces inside P_prior that are already in LP. If there is no P_prior with interior white space that can accommodate P, then it may search available white spaces in LP that are not inside to P_priors. If there is no L found, this means that P cannot be accommodated anywhere in LP. If so, the Cut-Out Printing Service may defer positioning of P to subsequent pages. In this case, the Cut-Out Printing Service may process the next largest cut-out pattern (smaller than P). In some cases, the search may be set to begin on remaining cut-out patterns that are smaller than P. This recursion may allow for finding of the next largest cut-out patterns and their placement inside white areas of previously positioned P_priors. If there are no white spaces inside P_priors, these subsequent cut-out patterns may be placed in white spaces in LP.

Next, the Cut-Out Printing Service may position P in L of LP. The record of white space is then updated to remove the space occupied by P in LP. As a result, a custom path is added in LP that serves as a clipping path (CP), to tell the system not to position subsequent cut-out patterns in the occupied space. This list of clipping paths (LCP) may be used for searching LP for L. Occupied spaces may be marked with CPs to exclude or disqualify those areas for use in positioning P.

Finally, the Cut-Out Printing Service may return to the first step (i.e., find the next largest cut-out pattern). The search may be reset to the start of a list of cut out patterns that have not been located on LPs. This recursion may allow for positioning of all cut-out patterns in the print job.

Figure 7:
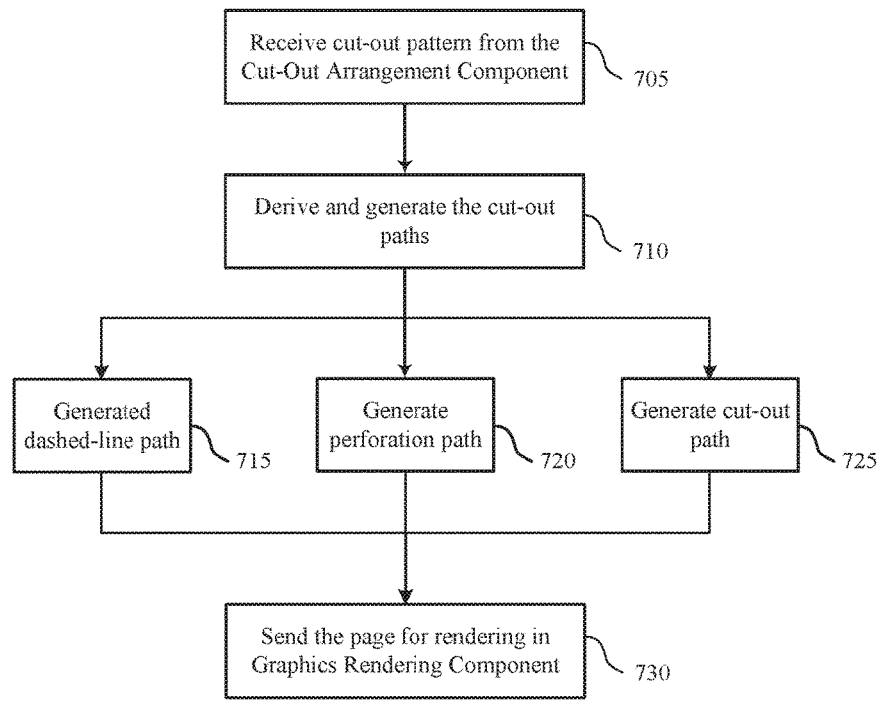

FIG. 7 shows a flowchart 700 of a process for arranging images, shapes or cut-out patterns within a document prior to printing cut-out patterns in accordance with aspects of the present disclosure. Specifically, flowchart 700 represents a method of marking Cut-Out Patterns for graphics rendering and finishing. In some examples, a Cut-Out Printing Service may execute a set of codes to control functional elements of the Cut-Out Printing Service to perform the described functions. Additionally, or alternatively, a Cut-Out Printing Service may use special-purpose hardware.

At block 705 the Cut-Out Printing Service may receive cut-out pattern from the Cut-Out Arrangement Component. These operations may be performed according to the methods and processes described in accordance with aspects of the present disclosure. For example, the operations may be composed of various substeps or may be performed in conjunction with other operations described herein. In certain examples, aspects of the described operations may be performed by Drawing Command Generator 140 as described with reference to FIG. 1.

At block 710 the Cut-Out Printing Service may derive and generate the cut-out paths. These operations may be performed according to the methods and processes described in accordance with aspects of the present disclosure. For example, the operations may be composed of various substeps or may be performed in conjunction with other operations described herein. In certain examples, aspects of the described operations may be performed by Drawing Command Generator 140 as described with reference to FIG. 1. After block 710, the process may proceed to block 715, block 720, or block 725 based on whether the cut-out patterns are to be outlined by dashed lines, perforation cutting lines, or complete cutting lines.

At block 715 the Cut-Out Printing Service may generate a dashed-line path. These operations may be performed according to the methods and processes described in accordance with aspects of the present disclosure. For example, the operations may be composed of various substeps or may be performed in conjunction with other operations described herein. In certain examples, aspects of the described operations may be performed by Drawing Command Generator 140 as described with reference to FIG. 1.

At block 720 the Cut-Out Printing Service may generate perforation path. These operations may be performed according to the methods and processes described in accordance with aspects of the present disclosure. For example, the operations may be composed of various substeps or may be performed in conjunction with other operations described herein. In certain examples, aspects of the described operations may be performed by Drawing Command Generator 140 as described with reference to FIG. 1.

At block 725 the Cut-Out Printing Service may generate cut-out path. These operations may be performed according to the methods and processes described in accordance with aspects of the present disclosure. For example, the operations may be composed of various substeps or may be performed in conjunction with other operations described herein. In certain examples, aspects of the described operations may be performed by Drawing Command Generator 140 as described with reference to FIG. 1.

At block 730 the Cut-Out Printing Service may send the page for rendering in Graphics Rendering Component. These operations may be performed according to the methods and processes described in accordance with aspects of the present disclosure. For example, the operations may be composed of various substeps or may be performed in conjunction with other operations described herein. In certain examples, aspects of the described operations may be performed by Drawing Command Generator 140 as described with reference to FIG. 1.

The sorted patterns generated by the Cut-Out Printing Service may not be sufficient for the actual cutting or marking of perforations in the paper material. For example, there may be no data yet that would tell the cutter finisher or perforation marking finisher how or where to perform the cutting or perforation marking operations on the paper. However, there may be cut-out patterns on the paper, e.g., the edges of cut-out patterns, whether interior or exterior on the cut-out patterns, that would not indicate to the finishers where to perform the cutting or per formation making operations, e.g., a prescribed distance from the edges of the cut-out patterns.

The output data from the sorting process may include the cut-out patterns, images or shapes that describe the occupied or unoccupied spaces on the logical page. For example, the output data may define a clipping path at a prescribed distance from the edge of the cut-out pattern. Such data may serve as the parameter for drawing dashed lines, and as parameters for cutting and perforation marking tools. These paths or shapes may be called cut-out paths. In some cases, this data may represent the outline of the outermost shape of a cut-out pattern. In general, it may also include the interior white spaces of the cut-out patterns. The cut-out path data may come from the list of clipping paths.

In some examples, cut-out paths may consist of the exterior perimeter and the interior perimeter of the rectangular frame. There may also be a cut-out path for the exterior and interior circumferences or circular white spaces.

In some examples, a printer driver or document editing applications may define the cut-out path as an external invisible shape or outline that enclose the cut-out patterns. The cut-out path generated in this example could serve as margins forming the shape of a square, rectangular, or other shapes around the cut-out pattern. The cut-out path can also be an irregular shape vector path around the cut-out pattern. Thus, printer-driver or application generated cut-out paths may have no white-spaces (i.e., everything within the cut-out path would be part of the cut-out pattern). The external invisible shape may serve as the path or shape for use in Graphics Rendering Component for drawing dashed lines, or to be followed and cut through the Cutting Finisher, or for marking by the Perforation Marking Finisher.

In some examples, where the printer driver or document editing application can identify white spaces in the interior of the cut-out patterns, even when there is an external invisible cut-out path enclosing the cut-out pattern, those identified white areas can also serve and be used as a cut-out path. In effect, the Cut-Out Print System may generate cut-out paths describing the cut-out patterns and all interior white spaces or unused white areas.

The cut-out paths may be any kind of shapes, in simple or complex configurations. These can be squares, circles, triangles, curves, and other irregular shapes, especially text for banners, logos, symbols, animal or people pictures, and so on. The cut-out paths may be definitions of these shapes and arranged in an optimal path for the cutting or perforation marking. The cut-out paths could also be generated using a mathematical formula (e.g., Bezier curves), or as custom vector paths, or other optimal definition of shapes, with specification for coordinates, angles, length, and other dimensional or geometrical parameters. In some cases, these can be a mixture of formulas like Bezier curves (with coordinates and required parameters for the formula) and simple shapes/paths. The Cutting Finisher and Perforation Marking Finisher may use the cut-out paths as data for drawing of dashed lines or as input to perform the actual cutting and/or marking of perforations around or within the cut-out patterns.

In some cases, the Cut-Out Printing System may draw dashed lines instead of actual cutting or adding of perforation marks. Dashed lines may be additional markings on the paper that show where cutting with scissors could be done on the printout after it is printed out of the paper. The system may generate a special case of a cut-out path, called dashed-line path. A dashed-line path may fall on the exact outline of the cut-out patterns or 1-pixel or some distance away or off of the cut-out pattern depending on the design of the pattern and desire of the user. In other words, the distance of the dashed lines from the outline (or edges) of the cut-out pattern can be configured through the use of job parameters like printer job language (PJL) parameters or print tickets. Example PJL job parameters can be a dashed line distance parameter, where the value of the parameter represents the pixel distance outside or away from the outline of the cut-out pattern. It must start from 1-pixel distance away from the outline so that the dashed line may be visible on the printout and not overlap with the pattern.

This sub-method for adding safe distance for dashed lines also applies for perforation marks. It may be desired that the perforation marks are outside and not exactly on the exterior and interior outlines of the cut-out patterns and its white spaces. For example, the perforation path can be 1-pixel away from the outlines, or some configuration distance as may be desired by the user through configuration or print job parameters. A perforation distance parameter can be used for specifying this distancing adjustment. In some cases, the perforation marks may be on the exact edges of the outline of shapes or cut-out pattern. In this case, the value of the perforation distance parameter may be 0.

As an example, after the cut-out patterns are generated, the Cut-Out Printing System may derive and generate the cut-out paths from the cut-out pattern shape data. If generating dashed lines, define a dashed-line path shape (i.e., 1-pixel or some configurable distance outside of the outline or exterior of the shape data of the cut-out pattern). This shape may be a graphics order or another command that draws dashed lines (or other symbols that serves the purpose and implies cutting lines) around the cut-out pattern.

If generating perforation marks, the Cut-Out Printing System may define a cut-out path similar to the method for dashed lines. In some cases, a perforation path may be on the exact outline of the cut-out pattern, or at 1-pixel or other distance away from the outlines. This distance can be based on the sharpness and width of the perforation marking tool.

If not generating dashed lines nor perforation marks, the Cut-Out Printing System may generate the general cut-out path. The cut-out path can be in the exact interior and exterior outlines of the cut-out pattern. In some cases, the Cut-Out Printing System may allow for adjustment of the cut-out path to be 1-pixel or some configurable distance away from the outline of the cut-out pattern. This may depend on the sharpness and width of the blade in the cutting finisher.

A hybrid method may include the combination of a regular cut-out path for the cutting finisher and dashed lines or perforation marks within the cut-out pattern. Such dashed-lines or perforation marks can serve as paths or shapes on which the cut-out pattern could be folded or cut after the cut-out pattern is cut from the paper. This can be accomplished by adding job parameters or print tickets that describe that interior white spaces or cut-out patterns within larger cut-out patterns are for perforation marks or dashed lines.

Example PJL job parameters may include a dash parameter, a perforation parameter, and a dash-perforation parameter (for combinations of dashed lines and perforations). The dashed lines or perforation could be chosen depending on how the interior cut-out patterns and/or white spaces are filled using odd-even fill method or other fill method algorithms.

Figure 8:
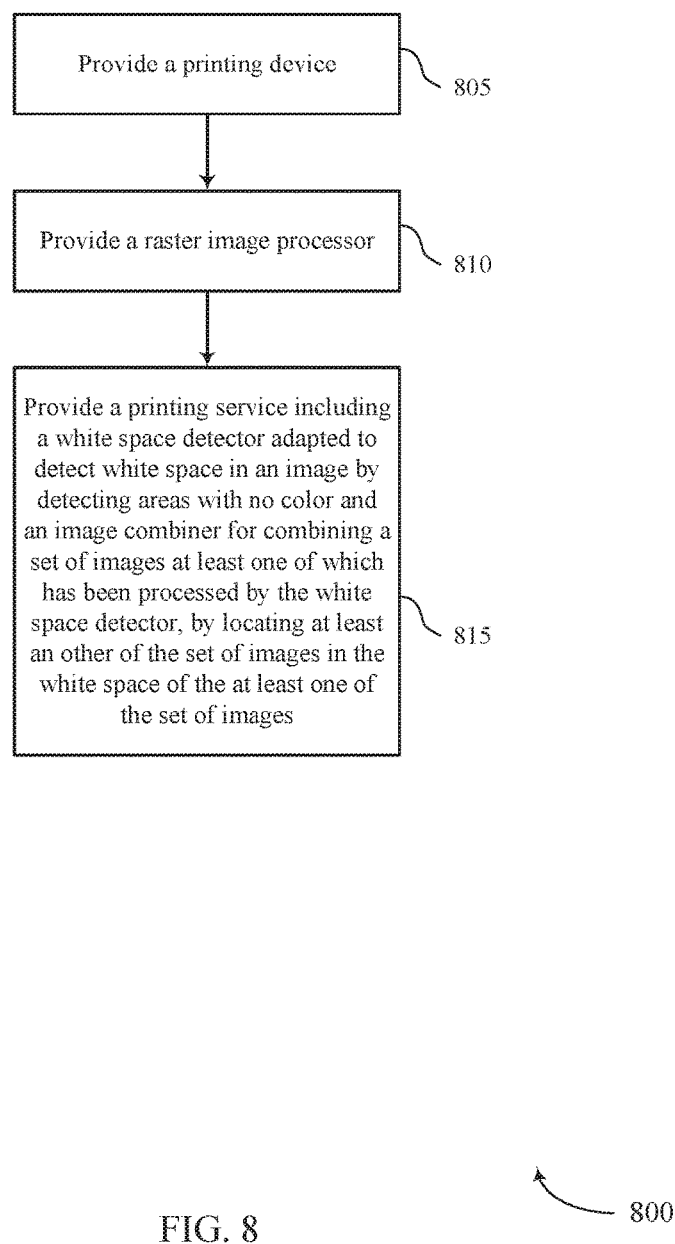

FIG. 8 shows a flowchart 800 of a process for arranging cut-out patterns within a document prior to printing cut-out patterns in accordance with aspects of the present disclosure. In some examples, a Printer Production System may execute a set of codes to control functional elements to perform the described functions. Additionally, or alternatively, a Printer Production System may use special-purpose hardware.

At block 805 the Printer Production System may provide a printing device. These operations may be performed according to the methods and processes described in accordance with aspects of the present disclosure. For example, the operations may be composed of various substeps or may be performed in conjunction with other operations described herein.

At block 810 the Printer Production System may provide the raster image processor component 110. These operations may be performed according to the methods and processes described in accordance with aspects of the present disclosure. For example, the operations may be composed of various substeps or may be performed in conjunction with other operations described herein.

At block 815 the Printer Production System may provide a printing service comprising a white space detector adapted to detect white space in an image by detecting areas with no color, and an image combiner for combining a plurality of images at least one of which has been processed by the white space detector, by locating at least another of the plurality of images in the white space of the at least one of the plurality of images. These operations may be performed according to the methods and processes described in accordance with aspects of the present disclosure. For example, the operations may be composed of various substeps or may be performed in conjunction with other operations described herein.

Figure 9:
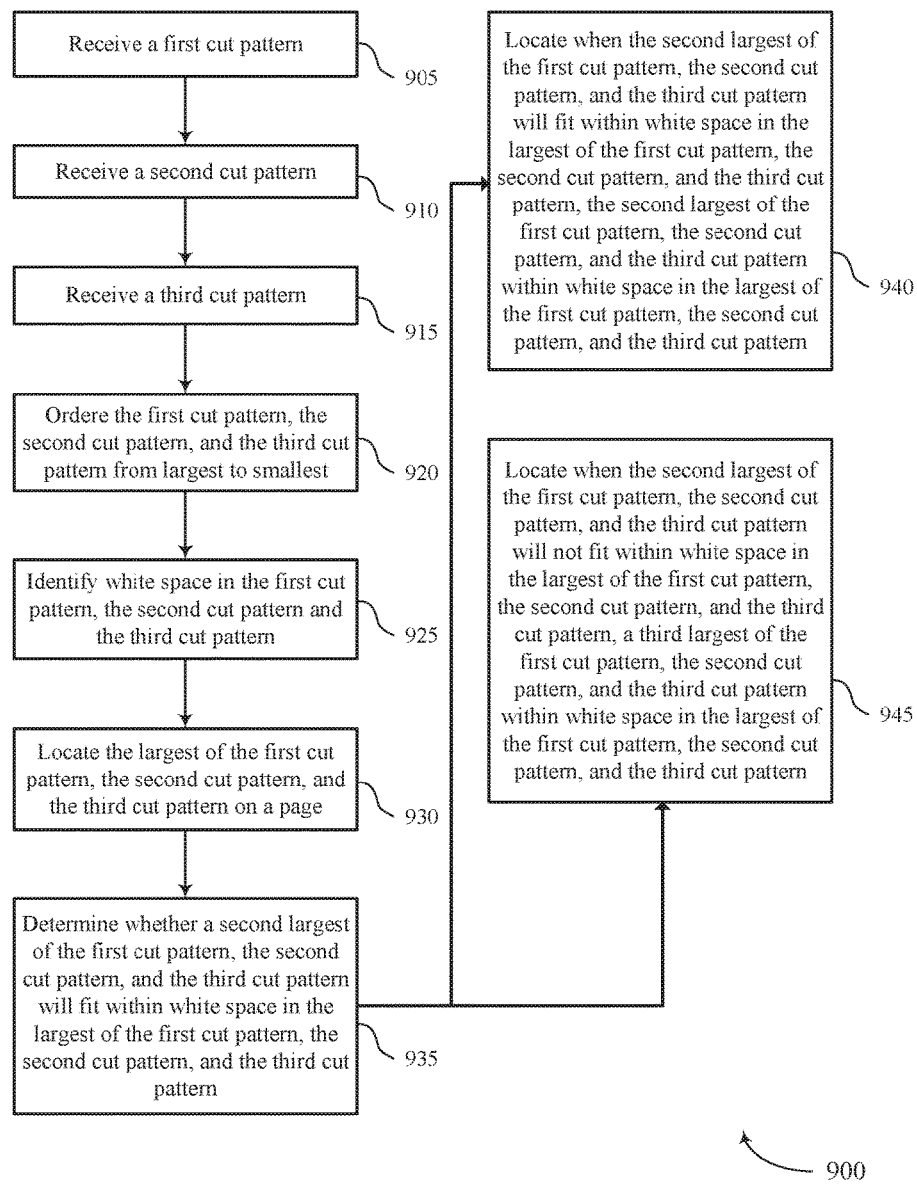

FIG. 9 shows a flowchart 900 of a process for arranging shapes within a document prior to printing cut-out images in accordance with aspects of the present disclosure. In some examples, a Cut-Out Printing Service may execute a set of codes to control functional elements of the Cut-Out Printing Service to perform the described functions. Additionally, or alternatively, a Cut-Out Printing Service may use special-purpose hardware.

At block 905 the Cut-Out Printing Service may receive a first cut pattern. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Printing Service 120 as described with reference to FIG. 1.

At block 910 the Cut-Out Printing Service may receive a second cut pattern. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Printing Service 120 as described with reference to FIG. 1.

At block 915 the Cut-Out Printing Service may receive a third cut pattern. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Printing Service 120 as described with reference to FIG. 1.

At block 920 the Cut-Out Printing Service may order the first cut pattern, the second cut pattern, and the third cut pattern from largest to smallest. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Identification Component 125 as described with reference to FIG. 1.

At block 925 the Cut-Out Printing Service may identify white space in the first cut pattern, the second cut pattern and the third cut pattern. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Identification Component 125 as described with reference to FIG. 1.

At block 930 the Cut-Out Printing Service may locate the largest of the first cut pattern, the second cut pattern, and the third cut pattern on a page. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Identification Component 125 as described with reference to FIG. 1.

At block 935 the Cut-Out Printing Service may determine whether a second largest of the first cut pattern, the second cut pattern, and the third cut pattern will fit within white space in the largest of the first cut pattern, the second cut pattern, and the third cut pattern. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Arrangement Component 135 as described with reference to FIG. 1.

After block 935, the process proceeds to block 940 or block 945 depending on the determination in block 935. Specifically, whether the second largest of the first cut pattern, the second cut pattern, and the third cut pattern will fit within white space in the largest of the first cut pattern, the second cut pattern, and the third cut pattern. If the second largest of the first cut pattern, the second cut pattern, and the third cut pattern will fit within white space in the largest of the first cut pattern, the second cut pattern, and the third cut pattern, block 940 is carried out. If the second largest of the first cut pattern, the second cut pattern, and the third cut pattern will not fit within white space in the largest of the first cut pattern, the second cut pattern, and the third cut pattern, block 945 is carried out. In some embodiments, based on the computer executable codes for defining the conditions in blocks 935, 940, and 945, blocks 940 and 945 may be considered to be carried out sequentially in either order or in parallel. For example, the system may be programmed to consider whether the conditions for carrying out block 940 is met, and if not, carry out block 945 by default or vice versa. The logics of the computer executable code may be variously implemented without departing from the spirit of the present disclosure.

At block 940 the Cut-Out Printing Service may locate when the second largest of the first cut pattern, the second cut pattern, and the third cut pattern will fit within white space in the largest of the first cut pattern, the second cut pattern, and the third cut pattern, the second largest of the first cut pattern, the second cut pattern, and the third cut pattern within white space in the largest of the first cut pattern, the second cut pattern, and the third cut pattern. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Arrangement Component 135 as described with reference to FIG. 1.

At block 945 the Cut-Out Printing Service may locate when the second largest of the first cut pattern, the second cut pattern, and the third cut pattern will not fit within white space in the largest of the first cut pattern, the second cut pattern, and the third cut pattern, a third largest of the first cut pattern, the second cut pattern, and the third cut pattern within white space in the largest of the first cut pattern, the second cut pattern, and the third cut pattern. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Arrangement Component 135 as described with reference to FIG. 1.

It should be understood that the steps 905-945 may be performed in a different order than that presented in FIG. 9. Various steps and operations may be performed in parallel as well. The order of the operations depicted is provided for explanatory reasons and is merely one example combination of operations in accordance with some embodiments described herein.

Figure 10:
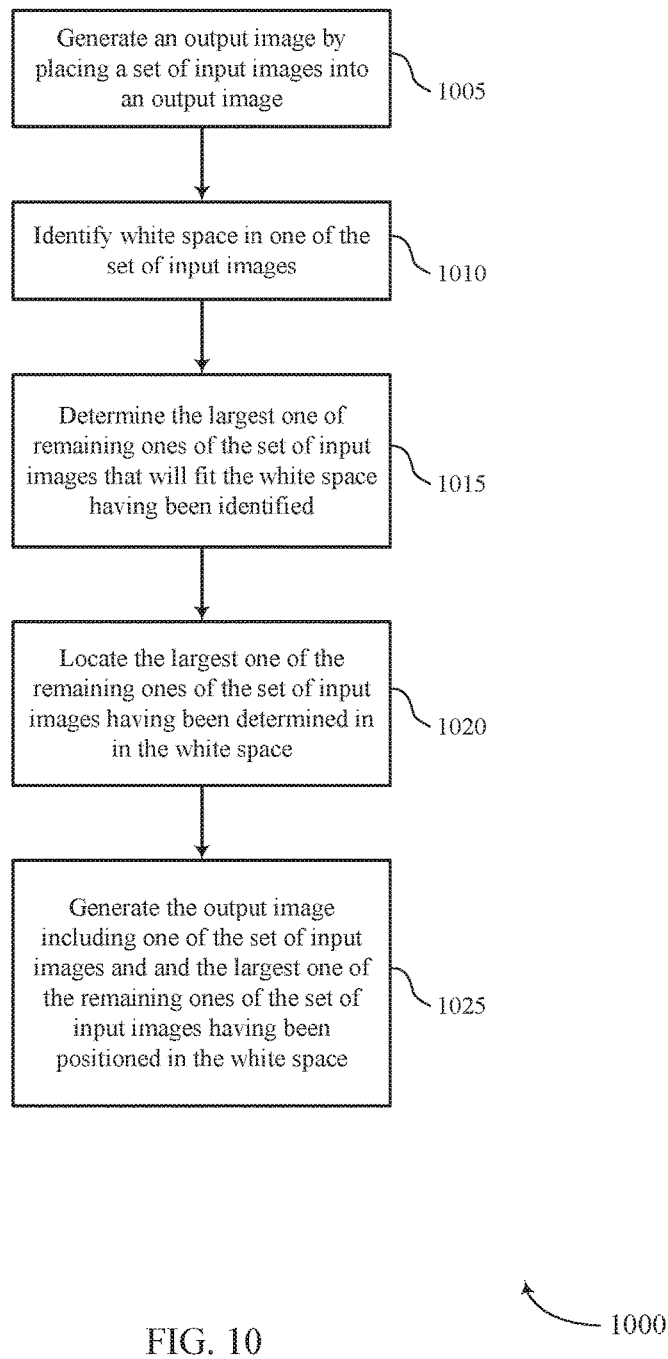

FIG. 10 shows a flowchart 1000 of a process for arranging shapes within a document prior to printing cut-out images in accordance with aspects of the present disclosure. In some examples, a Cut-Out Printing Service may execute a set of codes to control functional elements of the Cut-Out Printing Service to perform the described functions. Additionally, or alternatively, a Cut-Out Printing Service may use special-purpose hardware.

At block 1005 the Cut-Out Printing Service may generate an output image by placing a plurality of input images into an output image. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Printing Service 120 as described with reference to FIG. 1.

At block 1010 the Cut-Out Printing Service may identify white space in one of the plurality of input images. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Identification Component 125 as described with reference to FIG. 1.

At block 1015 the Cut-Out Printing Service may determine the largest one of remaining ones of the plurality of input images that will fit the white space having been identified. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Identification Component 125 as described with reference to FIG. 1.

At block 1020 the Cut-Out Printing Service may locate the largest one of the remaining ones of the plurality of input images having been determined in the white space. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Identification Component 125 as described with reference to FIG. 1.

At block 1025 the Cut-Out Printing Service may generate the output image comprising one of the plurality of input images and the largest one of the remaining ones of the plurality of input images having been positioned in the white space. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Arrangement Component 135 as described with reference to FIG. 1.

Some of the functional units described in this specification have been labeled as modules, or components, to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples, and applications thereof, numerous modifications and variations could be made thereto by those skilled in the art without departing from the scope of the invention set forth in the claims.

What is claimed is:

1. A method for printing and cutting, comprising:
   receiving a first cut pattern;
   receiving a second cut pattern;
   receiving a third cut pattern;
   ordering the first cut pattern, the second cut pattern, and the third cut pattern from largest to smallest;
   identifying white space in the first cut pattern, the second cut pattern and the third cut pattern;
   locating the largest of the first cut pattern, the second cut pattern, and the third cut pattern on a page;
   determining whether a second largest of the first cut pattern, the second cut pattern, and the third cut pattern will fit within white space in the largest of the first cut pattern, the second cut pattern, and the third cut pattern;
   locating when the second largest of the first cut pattern, the second cut pattern, and the third cut pattern will fit within white space in the largest of the first cut pattern, the second cut pattern, and the third cut pattern, the second largest of the first cut pattern, the second cut pattern, and the third cut pattern within white space in the largest of the first cut pattern, the second cut pattern, and the third cut pattern; and
   locating when the second largest of the first cut pattern, the second cut pattern, and the third cut pattern will not fit within white space in the largest of the first cut pattern, the second cut pattern, and the third cut pattern, a third largest of the first cut pattern, the second cut pattern, and the third cut pattern within white space in the largest of the first cut pattern, the second cut pattern, and the third cut pattern.

2. The method of claim 1, further comprising:
   printing the page with the ones of the first cut pattern, the second cut pattern, and the third cut pattern having been located.

3. The method of claim 2, further comprising:
   finishing the page by cutting at a perimeter of the ones of the first cut pattern, the second cut pattern, and the third cut pattern having been located.

4. The method of claim 2, further comprising:
   finishing the page by perforating at a perimeter of the ones of the first cut pattern, the second cut pattern, and the third cut pattern having been located.

5. The method of claim 2, further comprising:
   finishing the page by marking dashed lines at a perimeter of the ones of the first cut pattern, the second cut pattern, and the third cut pattern having been located.

6. The method of claim 1, wherein identifying white space comprises excluding a margin from said white space.

7. The method of claim 6, wherein the margin coincides with a perimeter of the ones of the first cut pattern, the second cut pattern, and the third cut pattern having been located.

8. The method of claim 1, further comprising:
   identifying a cut line, wherein the cut line is a prescribed distance from an edge of the first cut pattern, second cut pattern and third cut pattern.

9. The method of claim 8, further comprising:
   after locating the first cut pattern, second cut pattern, and third cut pattern, and identifying the cut line, printing the page with the first cut pattern, the second cut pattern, the third cut pattern, and the identified cut line.

10. A system for printing and cutting, comprising:
    a printing service configured to receive parsed print job data and perform the steps of:
    receiving a first cut pattern;
    receiving a second cut pattern;
    receiving a third cut pattern;
    ordering the first cut pattern, the second cut pattern, and the third cut pattern from largest to smallest;

identifying white space in the first cut pattern, the second cut pattern and the third cut pattern;

locating the largest of the first cut pattern, the second cut pattern, and the third cut pattern on a page;

determining whether a second largest of the first cut pattern, the second cut pattern, and the third cut pattern will fit within white space in the largest of the first cut pattern, the second cut pattern, and the third cut pattern;

locating when the second largest of the first cut pattern, the second cut pattern, and the third cut pattern will fit within white space in the largest of the first cut pattern, the second cut pattern, and the third cut pattern, the second largest of the first cut pattern, the second cut pattern, and the third cut pattern within white space in the largest of the first cut pattern, the second cut pattern, and the third cut pattern; and locating when the second largest of the first cut pattern, the second cut pattern, and the third cut pattern will not fit within white space in the largest of the first cut pattern, the second cut pattern, and the third cut pattern, a third largest of the first cut pattern, the second cut pattern, and the third cut pattern within white space in the largest of the first cut pattern, the second cut pattern, and the third cut pattern.

11. The system of claim 10, further comprising:
a printing device configured to perform the step of printing the page with the ones of the first cut pattern, the second cut pattern, and the third cut pattern having been located.

12. The system of claim 11, further comprising:
a finishing component configured to perform the step of finishing the page by cutting at a perimeter of the ones of the first cut pattern, the second cut pattern, and the third cut pattern having been located.

13. The system of claim 11, further comprising the step of:
finishing the page by perforating at a perimeter of the ones of the first cut pattern, the second cut pattern, and the third cut pattern having been located.

14. The system of claim 11, further comprising the step of:
finishing the page by marking dashed lines at a perimeter of the ones of the first cut pattern, the second cut pattern, and the third cut pattern having been located.

15. The system of claim 10, wherein identifying white space comprises excluding a margin from said white space.

16. The system of claim 15, wherein the margin coincides with a perimeter of the ones of the first cut pattern, the second cut pattern, and the third cut pattern having been located.

17. The system of claim 10, further comprising the printing service configured to identify a cut line, wherein the cut line is a prescribed distance from an edge of the first cut pattern, second cut pattern and third cut pattern.

18. The system of claim 17, further comprising:
a printing device configured to perform the step of, after locating the first cut pattern, second cut pattern, and third cut pattern, and identifying the cut line, printing the page with the first cut pattern, the second cut pattern, the third cut pattern, and the identified cut line.

* * * * *